Feb. 28, 1928.
A. E. NIELSEN ET AL
1,660,520
BELT TENSIONING APPARATUS
Filed Aug. 13, 1924 — 2 Sheets-Sheet 1
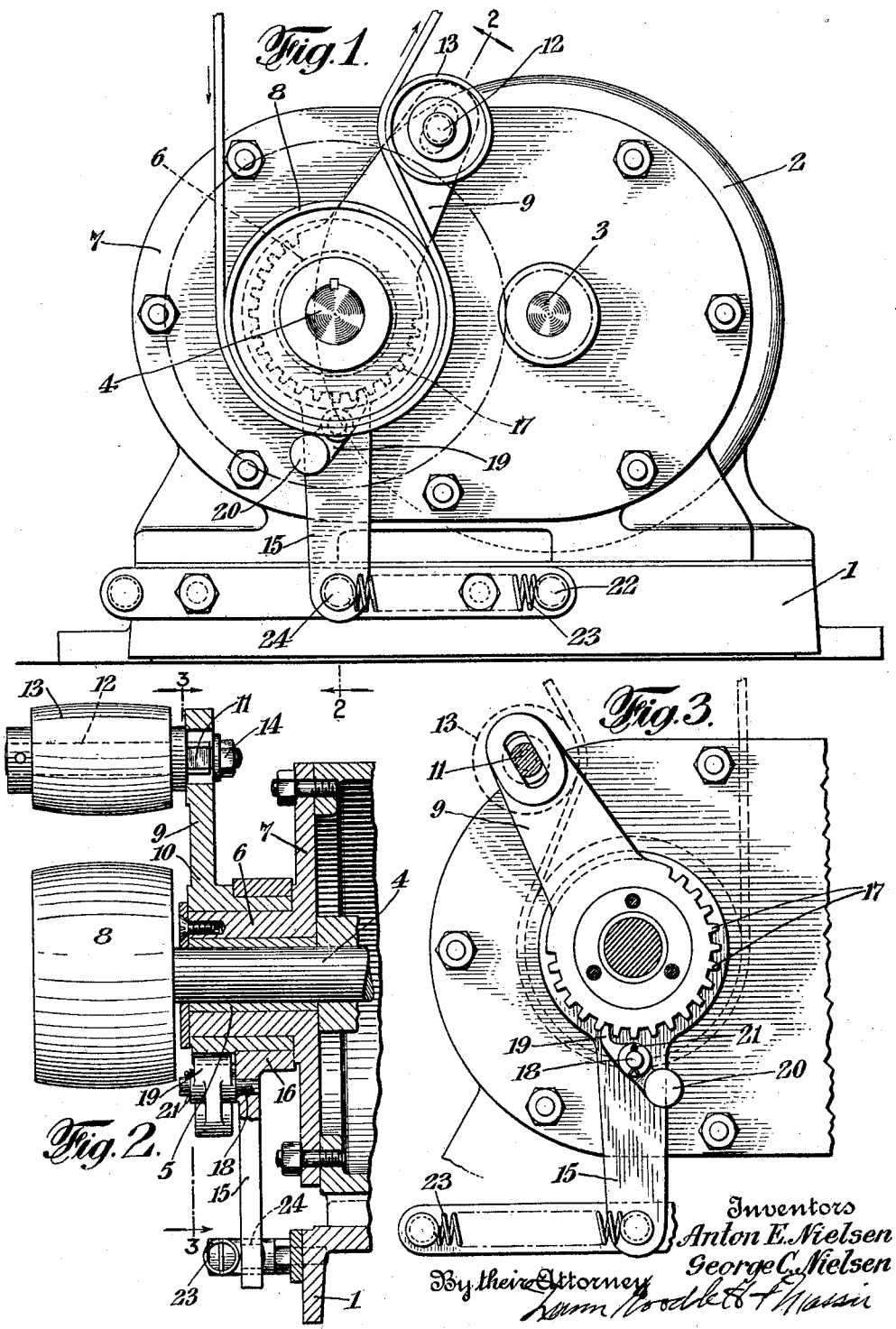

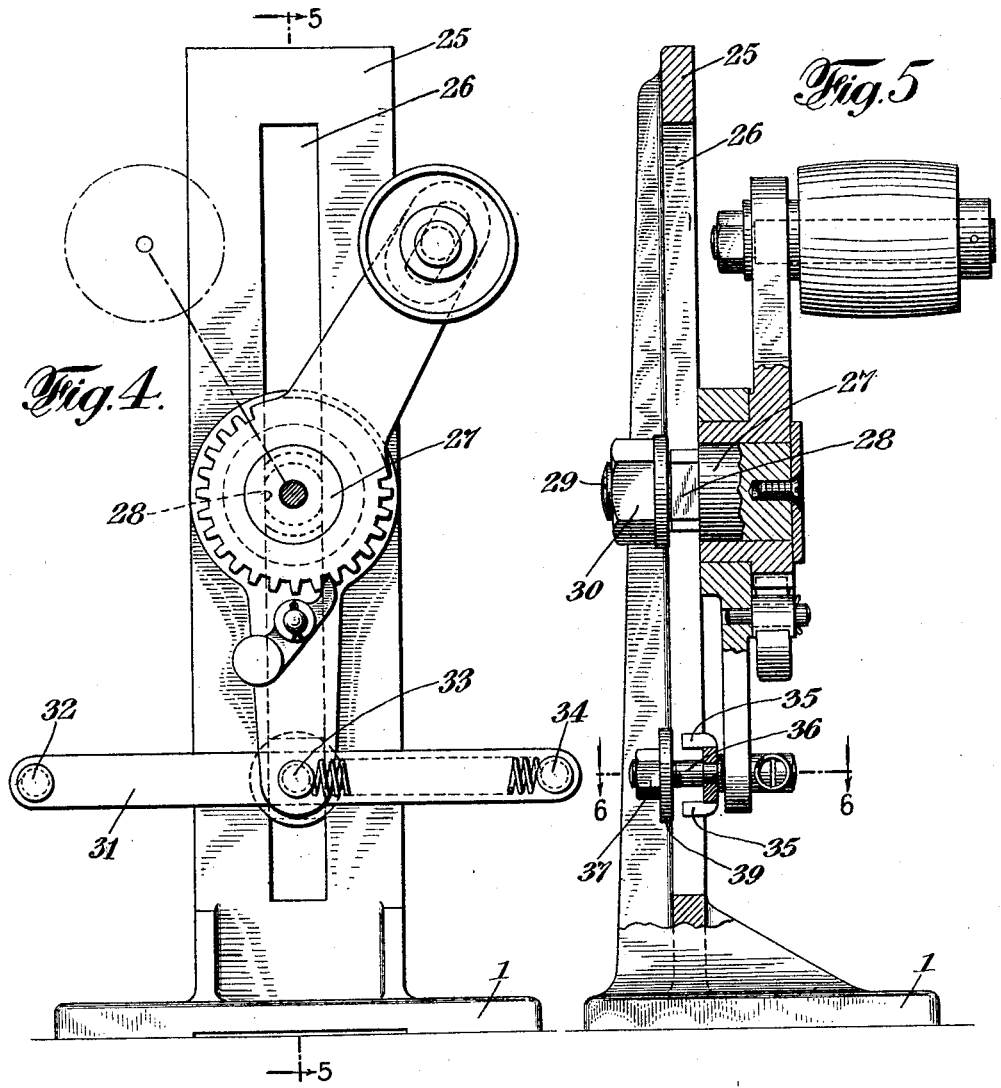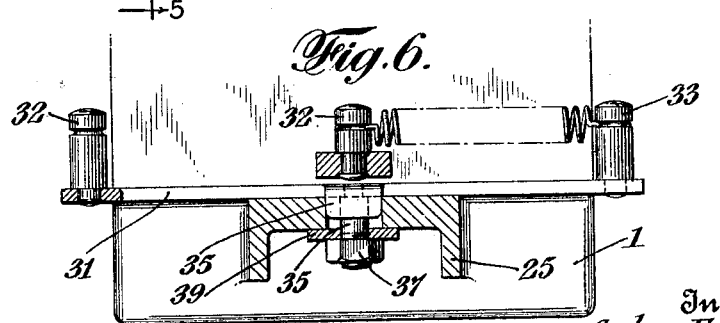

Patented Feb. 28, 1928.

1,660,520

UNITED STATES PATENT OFFICE.

ANTON E. NIELSEN AND GEORGE C. NIELSEN, OF NEW YORK, N. Y.

BELT-TENSIONING APPARATUS.

Application filed August 13, 1924. Serial No. 731,719.

This invention relates to certain new and useful improvements in belt tensioning apparatus and especially to such as are readily adjustable to meet the varying conditions of service. In many industries, power is transmitted by means of belts of various kinds, which connect the source of power with the machine to be driven, and the economical transmission of power is, in many cases, a serious problem. For instance, a single motor may be designed to operate considerable number of individual machines, and at times but one or two of these machines may be in service. At other times, a half a dozen or more may be operating, and, in such case, operating conditions are different.

To operate efficiently and without undue wear, the tension of the belt should be adjusted according to the load. That is, to drive six or eight machines, the belt should be considerably tighter than when but one or two operate. Upon the other hand, in order to prevent the belt from slipping and undue wear thereon, the belt should be no tighter than is necessary to drive satisfactorily under any given load, as excessive tension stretches and rapidly deteriorates the belt. In many instances, load changes occur at frequent intervals and, unless the belt tension is altered to meet these conditions, uneconomical results occur, and it is an important object of my invention to produce a belt tensioning device which will not only maintain the proper tension of the belt at all times, but one in which the tension can be adjusted quickly and with a minimum of trouble.

In addition, it is an object of my invention to produce a device which is adaptable to existing power transmission systems of all kinds, and one which can be applied thereto in almost any location with a minimum of trouble and expense.

In the drawings forming part of this application, we have illustrated two embodiments of our invention, but it will be understood that these are set forth for illustrative purposes only, as the invention may be embodied in many other forms and structures.

Referring now to the drawings,—

Fig. 1 is a side elevation of my improved belt tensioning device associated with or applied to a power unit.

Fig. 2 is a sectional view of the tensioning device taken on the lines 2—2 of Fig. 1, looking in the direction of the arrows.

Fig. 3 is an enlarged detailed view of the mechanism for adjusting the tension.

Fig. 4 is a side elevation of another form of my invention adapted for use with power plants generally.

Fig. 5 is a sectional view of the same taken on lines 5—5 of Fig. 4, looking in the direction of the arrows.

Fig. 6 is a horizontal section of this form of apparatus taken on lines 6—6 of Fig. 5 and looking downward thereon.

Similar numerals of reference indicate like parts in all the figures.

In the structure shown in Figs. 1, 2 and 3 of the drawings, 1 indicates a suitable base or support, upon which is mounted a power unit, such as an electric motor 2. The motor has a drive shaft 3 which, by means of gears (not shown), is connected to and operates the transmission or power shaft 4. This shaft is adapted to rotate in a suitable bearing 5 mounted in a cylindrical housing 6 extending from the face 7 of the gear case. The shaft carries a power or driving pulley 8.

A tension member, comprising an arm 9 and a cylindrical sleeve 10, the latter of which is mounted upon the bearing 6 to rotate freely thereon, is also provided, and the outer end of the arm is provided with a slot, in which is adjustably secured the end 11 of the shaft 12 which carries the tension pulley 13, a nut 14 serving to secure the shaft 12 in the desired position. Another tension member, consisting of an arm 15 and a sleeve 16, is also provided, the latter sleeve being mounted to rotate freely upon the outside of the sleeve 10. A segment of the periphery of this sleeve 10, is provided with a series of teeth 17, and the arm 15 carries a pin or stud 18, upon which is mounted a pawl 19 having a counter-balanced or weighted end 20. This pawl is removably secured upon the stud by any suitable means, such as a cotter pin 21, and is adapted to engage and cooperate with the teeth 17 on the sleeve 10, above described.

To the base 1 is also secured, by any suitable means, such as a stud 22, one end of a tensioning spring 23. The other end of the spring is connected by any suitable means, such as a stud 24, with the outer end of the arm 15.

The structure illustrated in Figs. 4, 5 and 6 of the drawings embodies a similar device adjustably mounted upon an independent frame or standard which can thus be made to cooperate with belt transmission systems already installed. In this construction, 1 indicates the base which carries the upright 25 provided with an extended slot 26, and these parts are preferably formed of an integral casting. The tensioning members, similar to those above described, are mounted to independently rotate upon an enlarged stud or shaft 27, having a reduced or flattened portion 28 and a threaded extension 29. The flattened portion 28 is of such size and shape as to have a slidable fit in the slot 26, and the stud is adjustably secured to the frame 25 by means of the nut 30. In a similar manner, a spring-supporting plate 31, having at the center and ends thereof studs 32, 33 and 34 and tongue portions or flanges 35 is mounted upon a bolt 36, having a nut 37. When assembled, as shown in Fig. 4, the bolt 36 passes through the slot, and the tongues 35 engage with the sides thereof, a retaining plate 39 and nut 37 clamping the parts in the desired position.

Referring now to the structure shown in Figs. 1, 2 and 3, the operation will be readily understood. The parts being disposed as in Fig. 1, the belt passes around the power pulley 8 and also contacts with the tension pulley 12. Proper tension is maintained upon the belt by reason of the fact that pulley 12 is being constantly forced to the left in the direction of the upper arrow, the spring 23, tending to contract, pulls the lower end of the arm 15 to the right, and the pawl 19 being seated between two of the teeth 17, tending to rotate the sleeve 10 in that direction. Should the tension of the device be too great, it can be instantly reduced by simply slipping the pawl out of engagement with the teeth 17 and permitting it to engage the teeth further to the right (see Fig. 1). Should the tension be too little, it can be increased to any desired extent by causing the pulley to engage teeth 17 to the left of those shown in Fig. 1.

The operation of the structure shown in Fig. 4 is substantially the same. The tension may be increased or decreased, according to the particular teeth with which the pulley is caused to engage, and the device is susceptible of practically universal application, as the tension device can be made to operate in either direction. For instance, as shown in full line in Fig. 4, the parts are engaged to cause a tension upon the belt in the direction shown by the upper arrow in Fig. 1. If, however, it is desired to adapt the device for use in an opposite direction all that is necessary is to remove the cotter pin 21 from the stud 18, reverse the position of the pawl, and move the tension pulley to approximately the position shown in dotted line in Fig. 4. When this is done, the outer end of the spring 23 is disengaged from the stud 34 and connected to stud 32, in which position the parts will operate exactly the same except in an opposite direction.

By means of this adjustability, the tensioning device can be applied to any existing system. The base may be secured upside down, as against the ceiling, upright upon the floor, or horizontal against the walls of the building, or wherever most convenient. In this way, we have provided a most complete and satisfactory tensioning device, adaptable for every condition of use, and one which can be regulated to meet the varying conditions of service and yet one which is rugged, substantial, composed of few parts, and which is therefore not likely to get out of order.

While we have shown our invention as applied to a belt of leather, canvas, rubber or the like, its application is by no means necessarily so limited. By the use of properly shaped tension pulleys other forms of belts, such as link or chain belts may be accommodated, in fact, any form of power transmission contrivances which require proper tensioning can be controlled.

Although we have shown two forms of our invention which are typical embodiments of our fundamental idea, these are by no means the only forms. Various modifications and changes may be made in structure from those above described and illustrated, without departing from the spirit of this invention.

What we claim and desire to secure by Letters Patent is:

1. A belt tensioning apparatus comprising a pair of concentrically pivoted movable arms, a belt engaging roller pivoted at the outer end of one of said arms, a spring operatively engaging the outer end of the other of said arms, and a ratchet-and-pawl connection between intermediate portions of said arms.

2. In a belt tensioning apparatus, the combination of a pair of concentrically pivoted movable arms, a belt engaging roller pivoted near the outer end of one of said arms, a series of engaging teeth concentrically disposed about the pivotal center of said arm, a spring operatively connected to the outer end of the other of said arms and to a suitable support, and a movable pawl pivoted to an intermediate portion of the last-mentioned arm and adapted to engage with the teeth of the first-mentioned arm.

3. In a belt tensioning apparatus the combination of a pair of concentrically pivoted arms, a belt engaging roller adjustably mounted near the end of one of said arms, tension controlling means operatively connected to the other of said arms, and an adjustable connection between said arms comprising a rack and a reversible pawl.

4. A belt tensioning apparatus comprising a belt-carrying spindle, a housing therefor, a movable arm having a tension roller pivoted near the outer end thereof and having a sleeve for co-operating with the housing, a second arm movably mounted upon said sleeve, a spring co-operating with the outer end of said second arm, and means for adjustably connecting said second arm with the sleeve of the first-mentioned arm.

ANTON E. NIELSEN.
GEORGE C. NIELSEN.